C. A. PARSONS, G. G. STONEY & A. H. LAW.
DYNAMO ELECTRIC MACHINERY.
APPLICATION FILED MAR. 14, 1910.
1,077,426.
Patented Nov. 4, 1913.
2 SHEETS—SHEET 1.
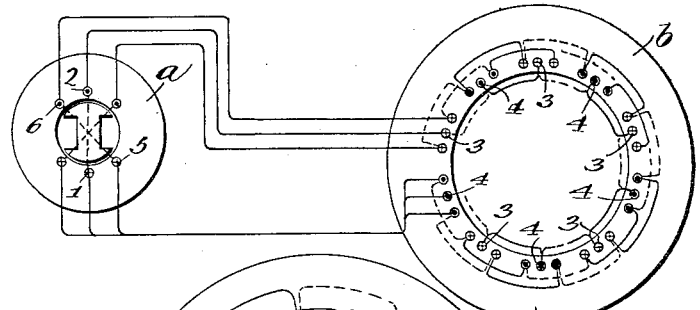
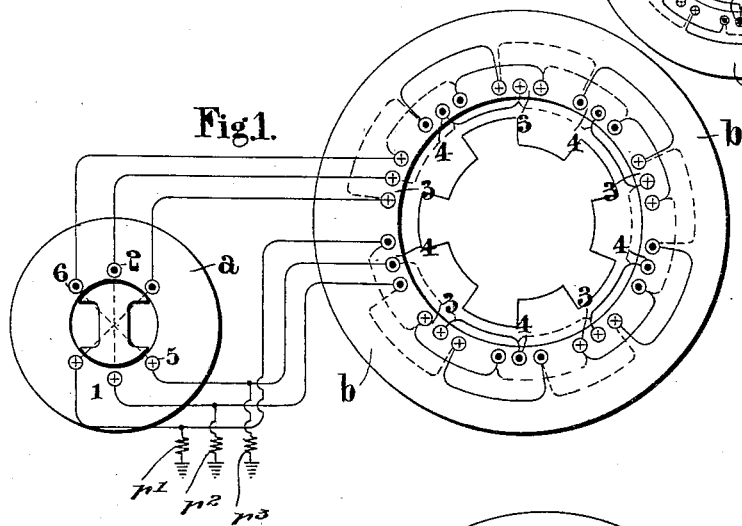
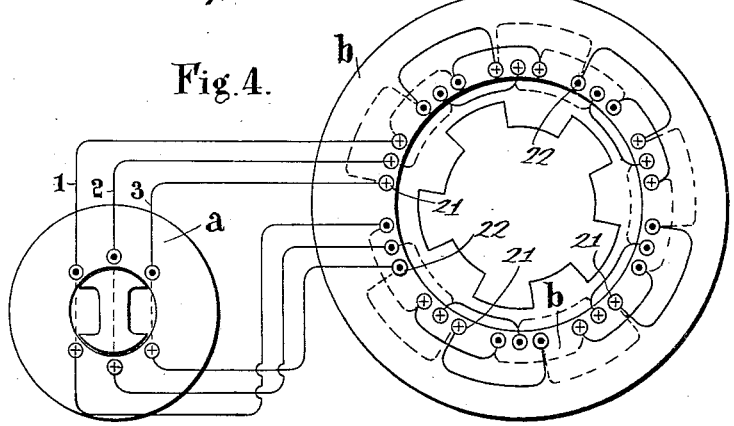
Inventors.
Charles A. Parsons
George G. Stoney
Alexander H. Law C. A. PARSONS, G. G. STONEY & A. H. LAW.
DYNAMO ELECTRIC MACHINERY.
APPLICATION FILED MAR. 14, 1910.
1,077,426.
Patented Nov. 4, 1913.
2 SHEETS—SHEET 2.
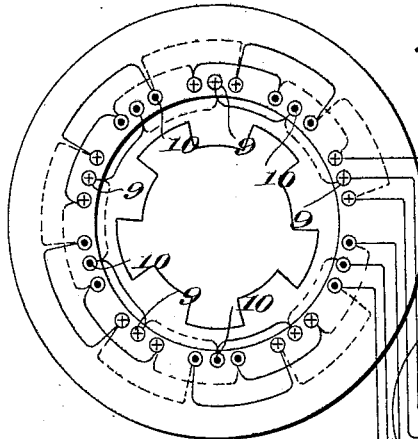
Fig. 2.
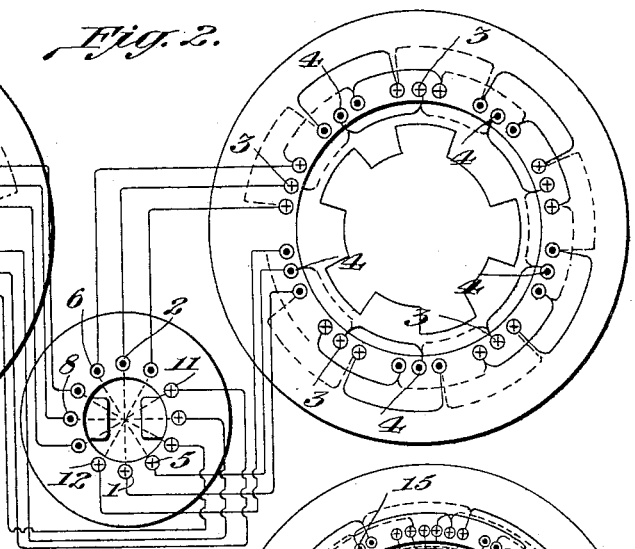
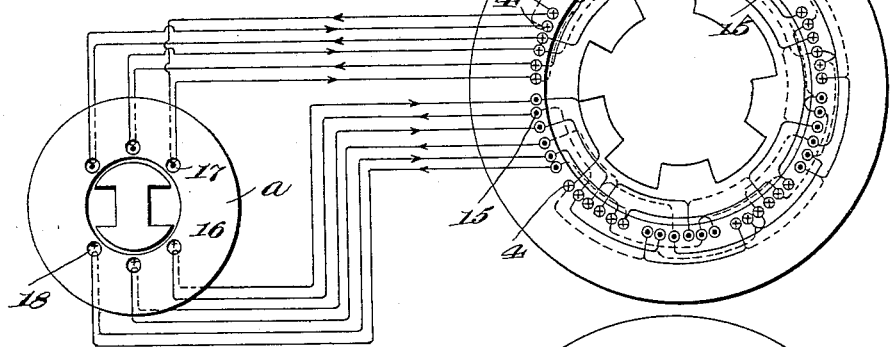
Fig. 5.
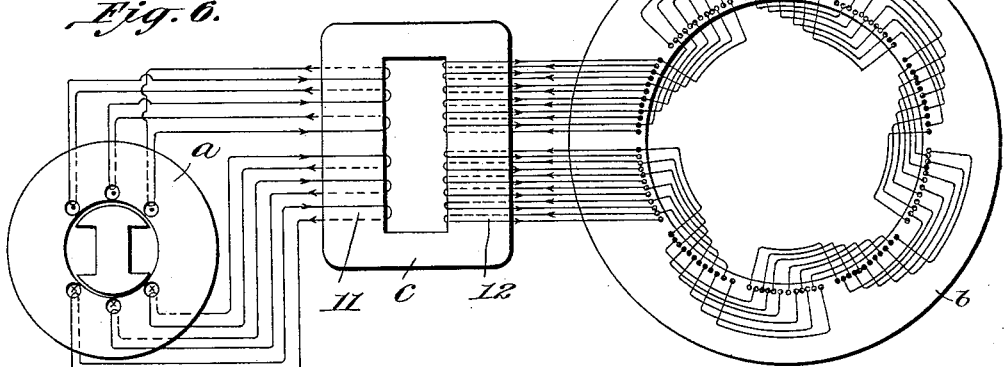
Fig. 6.
Witnesses:
Inventor:
Charles A. Parsons
George G. Stoney and A. H. Law

UNITED STATES PATENT OFFICE.

CHARLES ALGERNON PARSONS, GEORGE GERALD STONEY, AND ALEXANDER HENRY LAW, OF NEWCASTLE-UPON-TYNE, ENGLAND; SAID STONEY AND LAW ASSIGNORS TO SAID PARSONS.

DYNAMO-ELECTRIC MACHINERY.

1,077,426. Specification of Letters Patent. Patented Nov. 4, 1913.

Application filed March 14, 1910. Serial No. 549,267.

*To all whom it may concern:*

Be it known that we, CHARLES ALGERNON PARSONS, C. B., GEORGE GERALD STONEY, and ALEXANDER HENRY LAW, all subjects of the King of Great Britain and Ireland, and residing at Heaton Works, Newcastle-upon-Tyne, in the county of Northumberland, England, have invented certain new and useful Improvements in Dynamo-Electric Machinery, of which the following is a specification.

The invention relates to dynamo electric machinery and has for its object to so construct generators and motors that one or more generators can drive one or more motors at the same or a different speed while at the same time the potential at no part of the winding is greatly different from that of earth.

Several proposals have been made for using electrical means in order to gear down high speed shafts, these involving the use of a dynamo driven by a steam engine or other prime mover supplying current to a motor or motors which drive the secondary shaft or shafts to be driven. For instance, it has been proposed to use one or more steam turbines driving alternators to supply current to motors driving or assisting to drive the propeller shafts of a ship. In such cases it is a serious objection that comparatively high voltages have to be used not only on account of the size of the switch gear and cables but also because a given sized alternator cannot conveniently be designed for less than a certain voltage without unduly reducing the number of slots per phase per pole. In many cases high voltage is objectionable partly by reason of want of simplicity and safety of working and also because, more especially in marine work, it is difficult to maintain the quality of the insulation owing to the presence in the air of considerable quantities of moisture and salt. In the case of electrical plant for driving the propellers of a ship it will be necessary to provide special arrangements for carrying large quantities of cold air to the engine room for cooling the alternators and motors and this air would frequently carry moisture and salt, making it difficult to maintain the insulation of the plant.

The invention consists in interwinding a generator or generators and a motor or motors in such a manner that a portion of the winding of the motor or motors alternates with a portion of the winding of the generator or generators whereby only small differences of potential have to be dealt with.

The present invention further consists in interwinding the generator and motor by carrying the winding through one, two, or other small number of slots of the generator armature and then through slots of the motor and back through one, two or other small number of slots of the armature, groups of generator windings alternating with groups of motor windings, the circuits through the groups of slots in the armature of the generator and the motor being in series or parallel whereby only comparatively small differences of potential have to be dealt with.

The invention further consists in interwinding a generator with a motor of a larger number of poles whereby the speed ratio is reduced.

By means of the invention in an electrical gearing of the type indicated any desired number of slots per pole per phase may be used without any part of the windings on either generator or motor largely differing in electrical potential from any other part or from earth. It will be seen that by this arrangement instead of generating and using a high voltage, say of 2000 volts, this voltage is generated and used in, say 20 steps of 100 volts each, and it will be readily seen that the connections can be so arranged that the maximum voltage above earth generated is that due to one conductor only; the maximum difference then between any two points of the winding will not exceed that due to two conductors.

Referring to the accompanying drawings:—Figure 1 shows a single phase gear with one form of winding according to the invention; Fig. 2 shows a two phase winding producing a similar result; Fig. 3 is a form similar to Fig. 1 but with a larger voltage reduction; Fig. 4 shows a single phase gear with parallel windings. Fig. 5 shows a modified form of the invention in which the return wires from the motor to the generator are combined into a single lead. Fig. 6 shows a modification in which the generator and motor are interwound with a transformer. In all the figures the dotted lines represent end windings of the motor and generator which pass at the back of the figure.

In the form of the invention shown in Fig. 1 all the windings of the generator, *a*, and motor, *b*, are in series and two generator conductors are in series per group, that is, the winding comes down one slot as 1, of the generator, *a*, up the opposite slot, 2, and then to the motor, *b*, and after passing through one conductor of each group of windings, 3, 4, of the motor, passes back to the generator and through another pair of generator slots, 5, 6, and so on. The return wires are preferably earthed through resistances $r'$, $r^2$, $r^3$. If desired one common return wire may be used between the motor and generator instead of the three separate wires as illustrated at Fig. 5. In this modification, the winding comes down one slot as 1 of the generator *a*, up the opposite slot 2, and then to the motor *b*, and after passing through one conductor 3, 4 of each group of windings in the motor, passes back to the generator, and through another pair of generator slots 5, 6, and so on. The above described arrangement gives a voltage reduction of three to one as compared with an arrangement in which the winding traverses all the slots of the generator before passing on to the motor. As there are one pair of poles in the generator and five pairs of poles on the motor a gear ratio of 5 to 1 is obtained.

In the form of the invention illustrated in Fig. 2 a two phase generator *a* is coupled to two single phase motors, *b c*, the arrangements for the two phases being similar to that shown in Fig. 1. In this arrangement the winding comes down one slot as 1, up the opposite slot 2, through one conductor 3, 4, of each group of windings of the motor *c*, back to the generator, and through another pair of generator slots 5, 6, and so on, as in Fig. 1, while the winding of the other motor *b* is connected in a similar manner through the slots 7, 8, 11, 12, etc., of the generator.

In the form shown in Fig. 3, the winding after passing through one slot 13 only of the generator *a* is carried to the motor *b* and after finishing one conductor 14, 15 of each group of windings of the motor *b* passes to the generator slot 16, and back through another conductor of each group of windings of the motor, back through the generator slot 17, again through a conductor of the motor, and back through the generator slot 18, and so on, alternately through slots in the motor and generator, back to the point 13 on the generator. In this case as the winding only passes through a single generator slot before passing to the motor a larger reduction of voltage, viz., 6 to 1 is obtained.

Fig. 4 shows an arrangement having three parallel windings 1, 2, 3, wound about the same axis. The phase in the three windings is the same, but the voltage in the three windings would be different and in this form therefore it is necessary to proportion the spacing of the slots in the motor *b* to suit the spacing of the slots in the generator *a*. In this arrangement the winding from the slot 3 of the generator passes through the conductor 21, 22, of the motor, and back to the slot 23 of the generator, the windings through the other slots of the generator having similar paths.

In the case of windings such as those shown in Figs. 1, 2 and 4, the number of conductors between the generator and motor may be reduced by combining the return conductors in one lead as shown at Fig. 5. Where a common return is used this may be provided separately or the fabric of a building or ship or other earth connection may be used. Further, according to the invention suitable points of the windings may be earthed as shown at Fig. 1 so as to reduce the difference of potential between any part of the winding and earth, the earth connection being preferably made through a resistance so as to reduce the harmful effects of short circuits.

The invention is applicable to single phase or polyphase plants having any desired number of phases. For instance, with a two phase plant the phases may be interwound between the generator and motor in the manner described above. Further, if a three phase arrangement is employed the windings can be arranged in a similar manner and in these cases if it be desired to reverse the direction of rotation of the motor without reversing the generator it will be necessary to provide switch gear for altering the sequence of the phases in a suitable manner. In some cases, however, as when a single phase motor is used, as for instance, on the shaft of a reciprocating engine driving the propeller shaft of a ship, and is supplied with current from a generator which may be driven by an exhaust steam turbine, no reversal either of the phase sequence or direction of rotation of the generator is necessary the motor running in whichever direction it is started by the reciprocating engine.

In the form of the invention in which one generator is interwound with two or more motors or vice versa, as for instance, in the case of a generator driving two shafts of a twin screw vessel, the generator may have a two phase winding with one phase operating each motor, as illustrated in Fig. 2, or three or more phases each working one or more motors may be employed. This arrangement has the advantage that a polyphase generator may be used with its attendant economy of material and cost while the motors are each single phase and can thus be run in either direction according as they are started.

One or more generators may be interwound with one or more motors and the generators may be driven by separate complete turbines, or by high and low pressure or the turbines may be divided into three or more stages in series on the steam; further the generators may have a different number of poles or phases and may be suitably coupled electrically so that a high degree of economy may be obtained at various speeds of ship. Further, it will be seen that we may interwind generator $a$ and motor $b$ as above described in combination with a transformer $c$ as illustrated in Fig. 6, the primary 11 of the transformer being interwound with the generator and the secondary 12 with the motor by carrying the winding through one, two or other small number of slots of the generator armature and then around one, two or more turns on the transformer and similarly interwinding the transformer secondary windings with the motor windings. This arrangement would be used where either exceptionally low voltages or excessively high voltages are required and where it is undesirable to wind the generator directly for this voltage.

The gear ratio may be altered in any of the arrangements above described in any convenient manner such as by recoupling the windings on the motor or generator to give a different number of poles.

Having now described our invention what we claim as new and desire to secure by Letters Patent is:—

1. Dynamo electric machinery comprising in combination a generator having an armature, a plurality of groups of windings each containing a small number of electro-motive force generating conductors on said armature, current utilizing devices, a plurality of groups of windings on said current utilizing devices, a plurality of connections leading current from each of said groups of conductors of said armature to said groups of windings on said current utilizing devices, return connections, one of each of said plurality of connections, one of said groups of conductors on said armature, one of said return connections and one of said groups of windings on said current utilizing devices being in series and forming a complete circuit, and said complete circuits being connected in series, as and for the purposes described.

2. Dynamo electric machinery comprising in combination, a generator having an armature, a plurality of groups of windings, each containing a small number of electromotive-force generating conductors on said armature, an electromotor, a plurality of groups of windings on said electro-motor, a plurality of connections leading current from each of said groups of conductors of said armature to said groups of windings on said electromotor, return connections, one of each of said plurality of connections, one of said groups of conductors on said armature, one of said return conductors and one of said groups of windings on said electromotor being in series and forming a complete circuit, and said complete circuits being connected in series, as and for the purpose described.

In testimony whereof, we affix our signatures in presence of two witnesses.

CHARLES ALGERNON PARSONS.
GEORGE GERALD STONEY.
ALEXANDER HENRY LAW.

Witnesses:
  FREDERICK GORDON HAY BEDFORD,
  ALBERT WILLIAM PARR.

Copies of this patent may be obtained for five cents each, by addressing the "Commissioner of Patents, Washington, D. C."